(12) United States Patent
Schneider et al.

(10) Patent No.: US 7,436,736 B2
(45) Date of Patent: Oct. 14, 2008

(54) HYDROPHONE ARRAY MODULE

(75) Inventors: John K. Schneider, Snyder, NY (US); Jack C. Kitchens, Tonawanda, NY (US)

(73) Assignee: Ultra-Scan Corporation, Amherst, NY (US)

( * ) Notice: Subject to any disclaimer, the term of this patent is extended or adjusted under 35 U.S.C. 154(b) by 0 days.

(21) Appl. No.: 11/837,855

(22) Filed: Aug. 13, 2007

(65) Prior Publication Data

US 2008/0037372 A1    Feb. 14, 2008

Related U.S. Application Data

(60) Provisional application No. 60/822,087, filed on Aug. 11, 2006.

(51) Int. Cl.
*B06B 1/06*    (2006.01)
(52) U.S. Cl. .................. 367/170; 381/174; 381/191; 367/181
(58) Field of Classification Search .............. 367/170, 367/181; 381/113, 114, 174, 191; 310/309
See application file for complete search history.

(56) References Cited

U.S. PATENT DOCUMENTS

| | | | | | |
|---|---|---|---|---|---|
| 3,736,436 | A | * | 5/1973 | Crites | 381/191 |
| 3,786,495 | A | * | 1/1974 | Spence | 381/191 |
| 4,245,329 | A | * | 1/1981 | Dubois | 367/170 |
| 4,910,840 | A | * | 3/1990 | Sprenkels et al. | 367/170 |

* cited by examiner

*Primary Examiner*—Ian J Lobo
(74) *Attorney, Agent, or Firm*—Hodgson Russ LLP

(57) ABSTRACT

A hydrophone array includes hydrophones having an electret means and may have TFT FETs to generate current in response to received longitudinal wave signals. The arrangement may also be used to transmit longitudinal wave signals. Storage capacitors may be coupled to each TFT FET output to act as sample and hold means. Digital switches may allow the sample and hold circuit to both reset and measure the output of the hydrophone element. Data lines may be used to indicate the location of the received signal on the longitudinal wave detector sensor array.

20 Claims, 5 Drawing Sheets

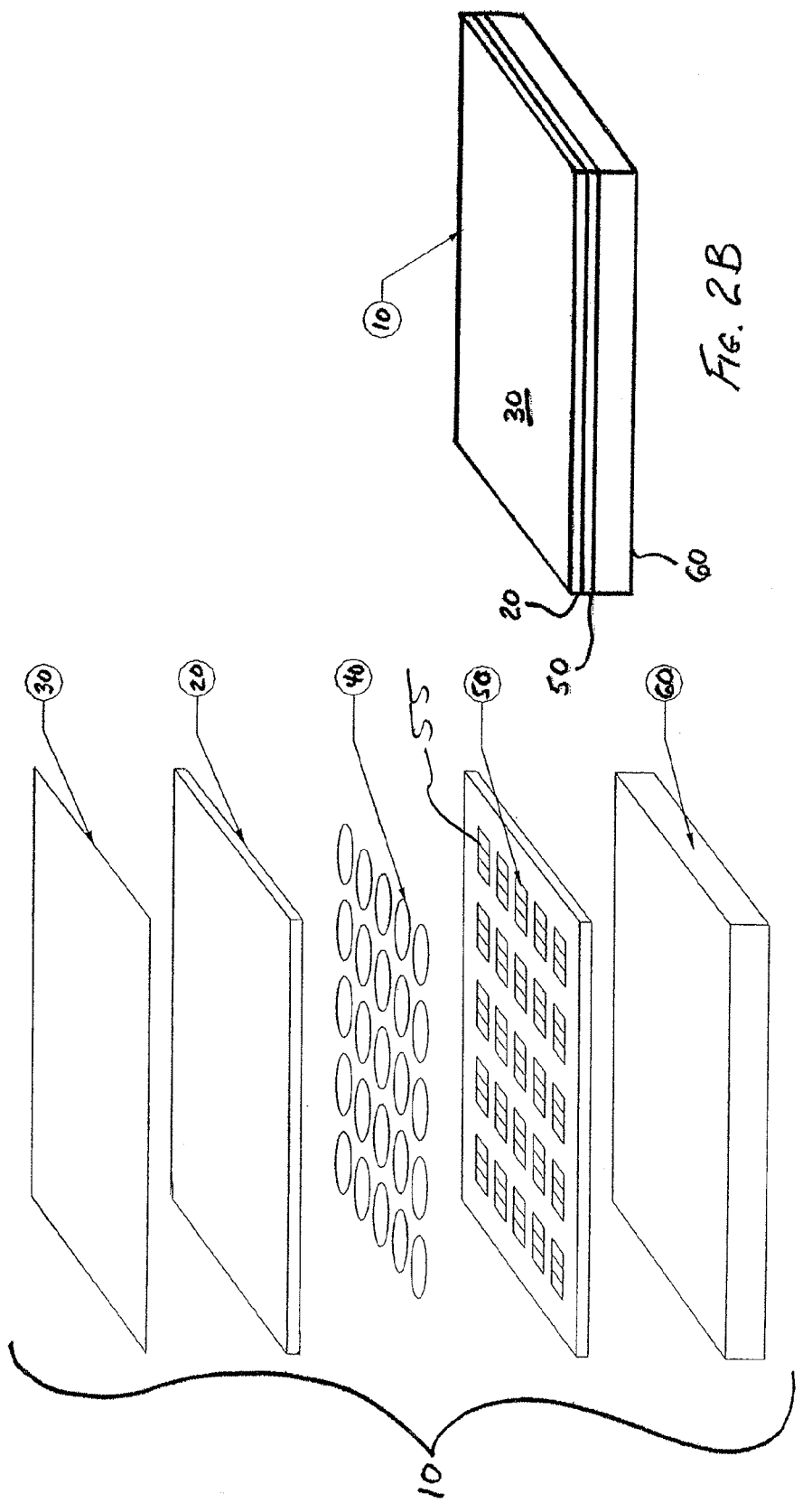

HYDROPHONE ARRAY MODULE

CROSS-REFERENCE TO RELATED APPLICATION

This application claims the benefit of priority to U.S. provisional patent application Ser. No. 60/822,087, filed on Aug. 11, 2006.

FIELD OF THE INVENTION

The present invention relates to sensing and producing longitudinal waves. The present invention may be embodied as a flat panel longitudinal wave sensor array that employs an electret device.

BACKGROUND OF THE INVENTION

FIG. 1 depicts a prior art device having a single-element hydrophone 7. This device has a small finger-like electrode 4 ("finger electrode 4") and a large area electrode 3 ("LA electrode 3"). Each of the electrodes is attached to a different side of an electret film 2 ("E film"). The molecules of the E film 2 are aligned so as to create a permanent electrostatic field. The two electrodes 3, 4 with the E film 2 between form a capacitor. When the distance between the electrodes 3, 4 changes, the voltage differential between the electrodes 3, 4 changes. The change in voltage may be detected in order to signal when pressure is being applied to the one or both of the electrodes 3, 4. In this manner, a longitudinal wave, such as an acoustic wave, may be detected.

In the prior art, a tip-portion 4A of the finger electrode 4 is positioned relative to the LA electrode 3 such that the distance from the tip-portion 4A of the finger electrode 4 to the LA electrode 3 is the same as the thickness of the E film 2. The E film 2 may be substantially flat and thereby defines a plane, and when viewed in a direction perpendicular to the plane, the electrodes 3, 4 may be thought of as having an overlapping area, which is shown in FIG. 1 as cross-hatched areas on each electrode 3, 4.

The overlapping area, and the E film 2 residing in that area, is commonly described as a hydrophone element 7. A first electrical connection (not shown) is made with the finger electrode 4, and a second electrical connection (not shown) is made with the LA electrode 3 in order to permit the hydrophone element 7 to detect acoustic energy impinging on the finger electrode 4 or impinging on the LA electrode 3.

Such prior art devices are often fabricated using a piece of E film 2 that is the size of a small shirt button. In such devices, the hydrophone element 7 may be a few thousandths of an inch wide. The electrodes 3, 4 are commonly formed using standard masking and sputtering techniques. In order to simplify manufacturing, the LA electrode 3 typically covers half of one side of the film 2.

The prior art devices, because of limited use and design, do not lend themselves well to mass production and are normally hand-made by skilled technicians in a very labor intensive manner.

SUMMARY OF THE INVENTION

The invention may be embodied as an acoustic hydrophone array module having an outer electrode and an array of smaller inner electrodes. A compressible electret film is positioned between the outer electrode and the array of inner electrodes. Each of the inner electrodes in the array may be connected directly or indirectly to a field-effect transistor ("FET"). The FETs may be arranged in an array on an insulating substrate. Information from this assembly may be used to create an image of an object that is representative of an acoustic signal emanating or reflected from the object. Alternatively, a longitudinal wave may be created by this assembly.

The outer electrode may be formed by vacuum sputtering or may be applied as a conductive adhesive or coating film bonded directly to the electret film. Similarly the array of inner electrodes may be masked and sputtered or pre-applied to the electret film and then connected to the FET array. Alternately, each of the inner electrodes may be a conductive adhesive dot, which may be applied directly to a FET and then the array of dots may be bonded and electrically connected to the electret film.

When configured to receive longitudinal waves, each of the inner electrodes may be thought of as being able to provide information corresponding to part of a larger acoustic image received by the outer electrode, and each of the corresponding FETs may be thought of as an amplifier of the signal received from that part. As the thickness of the electret element changes in response to pressure waves, the charge on the electrodes changes, and that change is detected by the FET.

When configured to emit longitudinal waves, each of the inner electrodes may be thought of as being able to provide part of the information that is sought to be transmitted. Each of the corresponding FETs may be thought of as drivers of the inner electrodes. When the FETs drive the voltage on the inner electrodes, the electret element changes thickness, and the outer electrode is caused to move, thereby creating a longitudinal wave.

One or more of the FETs may be formed as a thin-film transistor ("TFT"). TFTs may be manufactured using known processes, and those processes are not detailed in this document.

BRIEF DESCRIPTION OF THE DRAWINGS

For a fuller understanding of the nature and objects of the invention, reference should be made to the accompanying drawings and the subsequent description. Briefly, the drawings are:

FIG. 2A is an exploded perspective view of an embodiment of the invention;

FIG. 2B shows the device of FIG. 2A in assembled form;

FURTHER DESCRIPTION OF THE INVENTION

Figure 1:
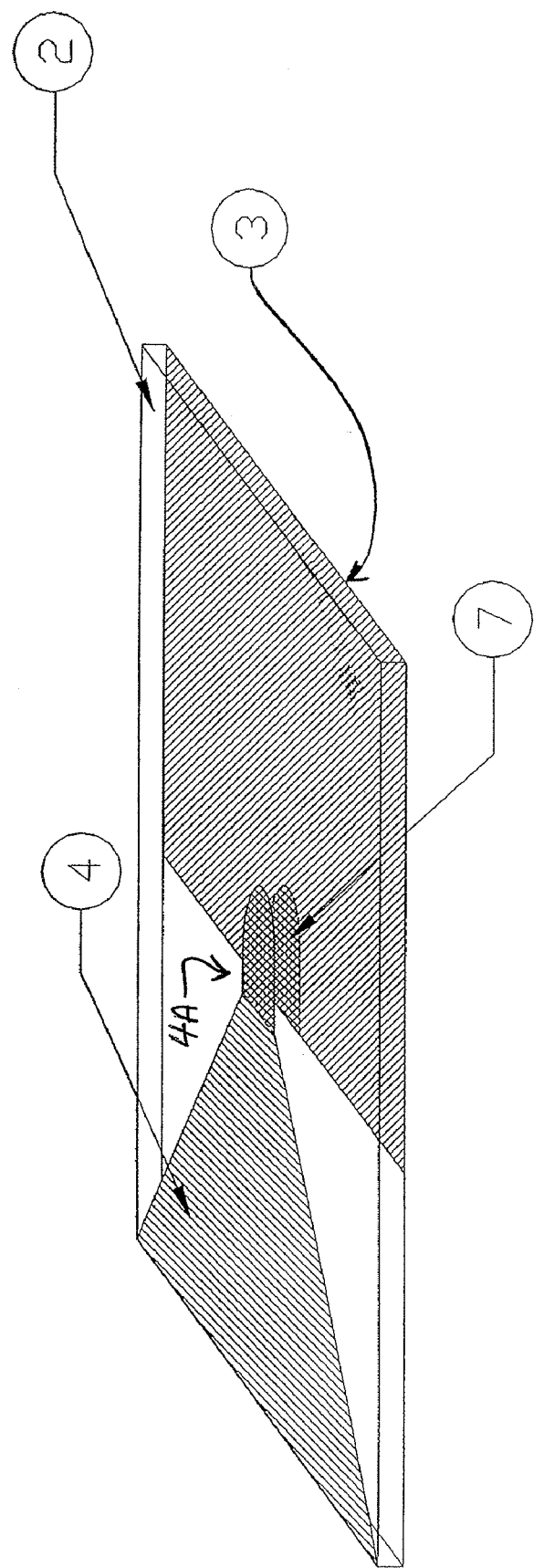
FIG. 1 is a diagram of a prior art single element acoustic film hydrophone (also called a membrane hydrophone)

FIG. 2A is an exploded perspective view showing certain components of a hydrophone array 10 that is in keeping with the invention. FIG. 2B shows the hydrophone array 10 in assembled form. In this embodiment of the invention, an outer electrode 30 has been applied to one side of an electret film 20 and an array of inner conductive electrodes 40 have been applied to the other side of the electret film 20. The electret film 20 may include polyvinylidenefluoride ("PVDF") polymer, or a copolymer of PVDF and trifluoroethylene ("TrFE"). However, the invention is not limited to these materials, and the electret film 20 may be a polymer, ceramic, crystalline or polycrystalline material exhibiting electret properties.

Applying the electrodes 30, 40 may be accomplished by various means that may include masked and sputtered deposition or adhesive bonding. The outer electrode 30 and/or inner conductive electrodes 40 may also be created by masking and etching. The resulting assembly may then be aligned and bonded to an array 50 of TFTs 55. Each TFT 55 may be a field-effect transistor ("FET") or group of FETs (or similar electrical components) that have been formed on an insulating substrate 60. Alternately, an adhesive layer, having the inner conductive electrodes 40 thereon, may be deposited to the TFT/FET array 50, and the film 20 may then be aligned, laid down and bonded to the TFT array 50 directly. Each TFT 55 may function as a switch corresponding to a portion of the outer electrode 30. For example, the gate of each TFT 55 may be electrically connected to one of the inner conductive electrodes 40.

Each of the TFTs 55 may also function as an amplifier, amplifying the signal from the inner electrodes 40, at a location which is highly proximate to the inner electrodes 40. The proximity of the TFTs 55 to the inner electrodes 40 enables the TFTs 55 to amplify the signals from the inner electrodes 40 while the signal-to-noise ratio is high.

Figure 2C:
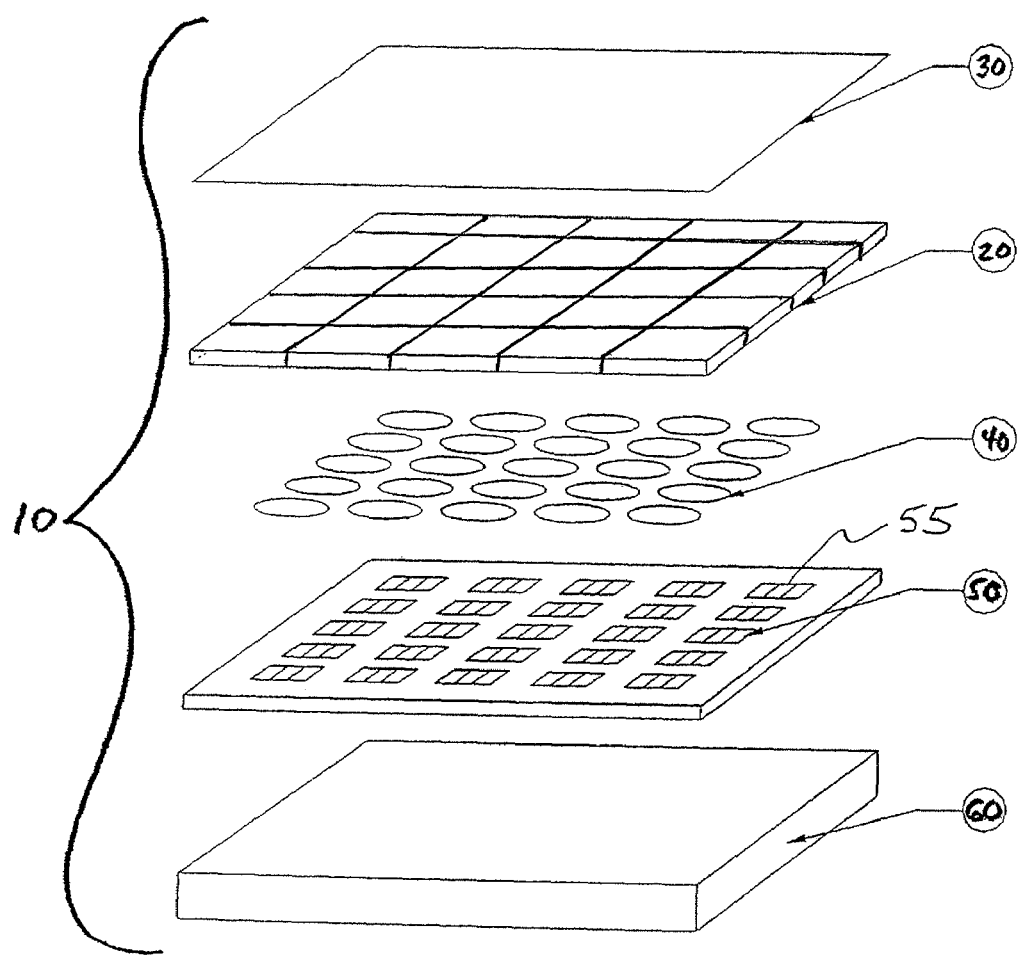
FIG. 2C shows an embodiment of the invention having an electret film provided as a plurality of discrete elements.

In this arrangement, each inner conductive electrode 40 may be thought of as corresponding to a portion of the outer conductive electrode 30 that is nearest to that inner conductive electrode 40. As such, each inner conductive electrode 40 and its corresponding portion of the outer conductive electrode 30 may be considered to be a pixel. To further define the boundaries of a pixel, in lieu of the electret film 20 corresponding to more than one inner conductive electrode 40, the electret film 20 may be provided in small pieces so that a small number of conductive electrodes 40 are associated with a particular piece of the electret material. FIG. 2C is similar to FIG. 2A, except that FIG. 2C depicts an embodiment of the invention in which the electret film 20 is provided as a plurality of discrete elements. In the embodiment of FIG. 2C, each element of the electret film 20 is associated with one of the inner conductive electrodes 40.

The voltage across each pixel may be controlled independently, and the signals received from each pixel may be normalized so that the full range of the gray scale may be utilized. In this fashion, small differences between signals received from pixels may be made discernable to a human being.

The array 50 of TFTs 55 is depicted as a panel. Manufacturing TFTs 55 for use on a substantially flat panel may be done by known processes, and this should reduce the cost of manufacturing the hydrophone array 10. TFTs 55 may be fabricated by depositing and patterning metals, insulators, and semiconductors on substrates through methods well known in the art. TFTs typically employ amorphous silicon, a CdSe film, or semiconducting polymers as the semiconductor material. Amorphous silicon is typically used in substantially flat panel applications because it is easily deposited on large area glass or plastic substrates. However, polysilicon or a semiconducting polymeric resin may be used. Since a TFT 55 is inexpensive to manufacture and has already been successfully incorporated into substantially flat panel applications, use of the present invention should result in the production of a hydrophone array at low cost.

Figure 3:
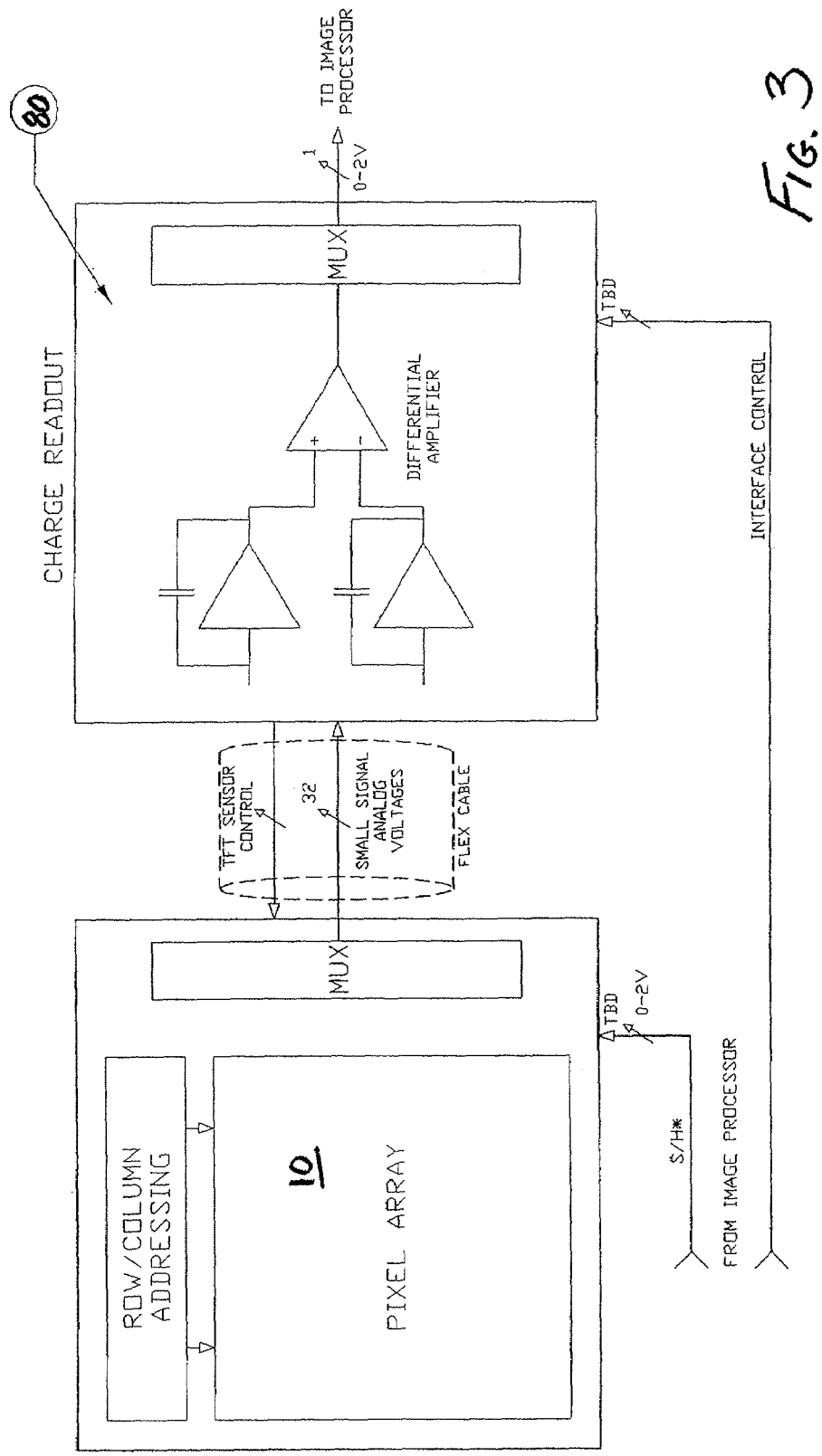
FIG. 3 is a schematic diagram of a typical TFT sensor and charge readout system suitable for application as a hydrophone array device.

With reference to FIG. 3, the hydrophone array 10 may make use of the various strengths of typical TFT array technology, such as row and column addressing, multiplexer components and sample-and-hold circuitry. The hydrophone array 10 may be electrically connected to a charge readout device 80, which may be used to address and amplify the low level signals available from each of the FETs into higher level signals that can then be subsequently passed to an analog/digital converter and image processing circuitry in order to produce a grayscale image suitable for subsequent applications, such as medical imaging or biometric identification.

Figure 4:
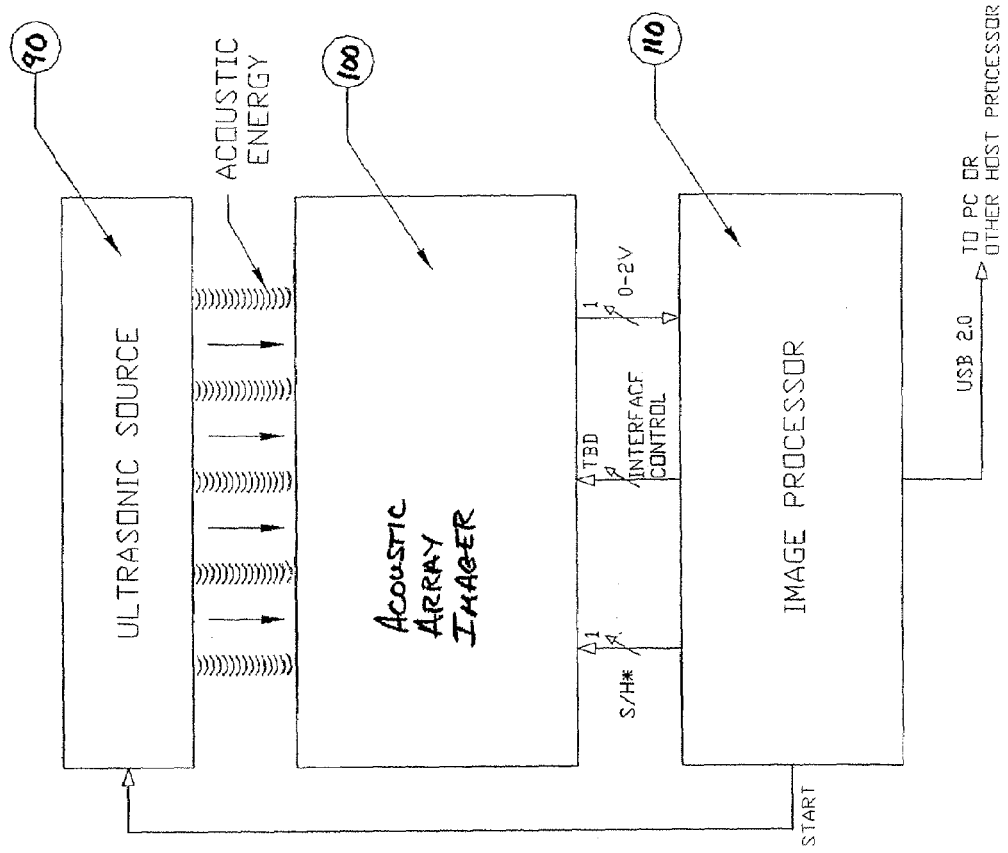
FIG. 4 is a block diagram of an embodiment of a hydrophone array device according to the invention.

FIG. 4 depicts a system in which a longitudinal wave source 90 sends longitudinal wave energy to an array imager 100, which may include the hydrophone array 10. The array imager 100 provides signal information to an image processor 110 that performs post processing on the collected information in order to generate an image of the longitudinal wave source 90. The longitudinal wave source 90 may be an object that reflects ultrasonic energy that has been sent toward the object, for example, a finger. Or the longitudinal wave source 90 may be an object having some material that readily transmits ultrasonic energy and some material that does not readily transmit ultrasonic energy, such as an arm of a person. A commercially available image processor 110 may be made by programming commercially available microcontrollers, that are available from Texas Instruments, Motorola or other manufacturers. The image processor 110 may be programmed to initiate an excitation pulse, and then retrieve the individual pixel data from the array 50, and then assemble that data into an image.

It should be recognized that a commercially useful version of the hydrophone array 10 shown in FIG. 2 may have many more sensor elements than are shown in FIG. 2. In such a device, each of the inner conductive electrodes 40 may be addressable, and therefore the hydrophone array 10 may be thought of as providing a plurality of addressable pixels. As such, the signal from any particular inner conductive electrode 40 may be obtained and used.

The descriptions of the hydrophone array 10 above have assumed that the hydrophone array 10 may be used to receive longitudinal waves, with the outer electrode 30 functioning as a receiving electrode. It should be noted that the hydrophone array 10 may be configured to send longitudinal waves. In such an embodiment of the invention, the inner conductive electrodes 40 may be driven to vary a voltage difference between an inner conductive electrode 40 (or some larger number of them), and the outer electrode 30, thereby causing the film 20 to compress or expand accordingly. In this manner, the outer electrode may be considered to be a transmitting electrode, for transmitting the longitudinal wave energy. The resulting movement of the film 20 causes the outer electrode to move in a corresponding manner, thereby producing a longitudinal wave.

When configured to send longitudinal waves, the outer electrode 30 is positioned to send longitudinal wave energy away from the hydrophone array 10. The electret film 20 is coupled to the outer electrode 30. The electret film 20 is compressible so as to create a longitudinal wave from the transmitting electrode 30 in response to changes in a thickness of the electret film 20. Since the array 50 of inner electrodes is coupled to the electret film 20, upon applying a voltage to one or more of the inner electrodes, the inner electrodes may be caused to have a different voltage from that of the outer electrode 30, and thus the thickness of the electret film 20 is caused to change. In changing the thickness of the electret film 20, the outer electrode is caused to move and thereby create a longitudinal wave. An array of switches may be used to control the voltage on the inner electrodes by electrically coupling each switch with one of the inner electrodes.

The topology of the array 50 may differ in component specifics from that described herein, and yet such differing panels may still offer equivalent performance. This document does not attempt to describe in detail every possible variation in such panels, or the many manufacturing processes that may be used to form such panels. Instead, the document is intended to acknowledge that such panels are available, and the various versions may be used in the invention claimed herein.

The voltage output of the capacitor formed by and including the electret film 20 and the voltage required to operate the TFT array 50 may be different, and so certain components may need to be employed in order for the TFT array 50 and the film 20 to be compatible. For example, a buffer, an amplification stage, rectification or attenuation may be needed in order to provide an appropriate voltage input to the FET of a specific TFT array 50.

The combination of an electret film 20 and an array 50 having TFTs 55 can provide an effective and economical alternative to conventional hydrophone devices. Electret detectors and TFTs 55 may be manufactured with corresponding readout TFTs (not shown) using conventional methods, thereby reducing mask counts and costs. The readout TFTs may afford a means by which a row in the TFT array 50 may be selected, and then a data sense circuit successively reads and records the output from each transistor in that row. Upon finishing one row, the next row is selected and the output from each transistor in that row is read and recorded.

A hydrophone array such as is taught in this document may be useful in creating an image of an object that selectively transmits or reflects longitudinal waves. For example, the invention may be used in medical or dental imaging applications, such as non x-ray mammograms or soft and hard tissue examination. The invention may be useful as an imaging device in conjunction with underwater sonar applications to create an image of submerged objects by reflecting acoustic energy. Further, the invention may be used in devices for identifying individuals, such as an ultrasonic fingerprint sensing system.

Although the present invention has been described with respect to one or more particular embodiments, it will be understood that other embodiments of the present invention may be made without departing from the spirit and scope of the present invention. Hence, the present invention is deemed limited only by the appended claims and the reasonable interpretation thereof.

What is claimed is:

1. A longitudinal wave sensor, comprising:
    an outer receiving electrode positioned to receive longitudinal wave energy;
    a compressible electret element coupled to the receiving electrode so as to receive pressure from the receiving electrode when longitudinal wave energy is received;
    an array of inner electrodes, at least one of the inner electrodes being coupled to the electret element, wherein as the pressure on the electret element changes the charge on the inner electrode changes;
    an array of switches, each switch electrically coupled with one of the inner electrodes so as to receive changes in the charge on the inner electrode; and
    a substrate supporting the switches.

2. The longitudinal wave sensor of claim 1, wherein at least one of the switches includes at least one transistor.

3. The longitudinal wave sensor of claim 2, wherein the transistor is a thin-film transistor.

4. The longitudinal wave sensor of claim 3, wherein the thin-film transistor includes amorphous silicon, polysilicon or semiconducting polymeric resin.

5. The longitudinal wave sensor of claim 1, wherein at least one of the switches is a field-effect transistor.

6. The longitudinal wave sensor of claim 1, wherein there is an array of discrete electret elements each of which is coupled with one of the inner electrodes.

7. The longitudinal wave sensor of claim 1, wherein the electret element is associated with more than one inner electrode.

8. The longitudinal wave sensor of claim 1, wherein the electret material includes polyvinylidenefluoride ("PVDF") polymer.

9. The longitudinal wave sensor of claim 1, wherein the electret material includes a copolymer of PVDF and trifluoroethylene ("TrFE").

10. The longitudinal wave sensor of claim 1 wherein the electret material is a polymer, ceramic, crystalline or polycrystalline material exhibiting electret properties.

11. A longitudinal wave emitter, comprising:
    an outer transmitting electrode positioned to send longitudinal wave energy;
    a compressible electret element coupled to the transmitting electrode, the electret element being compressible so as to create a longitudinal wave from the transmitting electrode in response to changes in a thickness of the electret element;
    an array of inner electrodes, at least one of the inner electrodes being coupled to the electret element, wherein as the voltage on the inner electrodes changes relative to the voltage on the outer transmitting electrode, the thickness of the electret element changes;
    an array of switches, each switch electrically coupled with one of the inner electrodes so as to alter the voltage on the inner electrode; and
    a substrate supporting the switches.

12. The longitudinal wave emitter of claim 11, wherein at least one of the switches includes at least one transistor.

13. The longitudinal wave emitter of claim 12, wherein the transistor is a thin-film transistor.

14. The longitudinal wave emitter of claim 13, wherein the thin-film transistor includes amorphous silicon, polysilicon or semiconducting polymeric resin.

15. The longitudinal wave emitter of claim 11, wherein at least one of the switches is a field-effect transistor.

16. The longitudinal wave emitter of claim 11, wherein there is an array of discrete electret elements each of which is coupled with one of the inner electrodes.

17. The longitudinal wave emitter of claim 11, wherein the electret element is associated with more than one inner electrode.

18. The longitudinal wave emitter of claim 11, wherein the electret material includes polyvinylidenefluoride ("PVDF") polymer.

19. The longitudinal wave emitter of claim 11, wherein the electret material includes a copolymer of PVDF and trifluoroethylene ("TrFE").

20. The longitudinal wave emitter of claim 11 wherein the electret material is a polymer, ceramic, crystalline or polycrystalline material exhibiting electret properties.

* * * * *